United States Patent [19]

Kraft

[11] 4,232,783

[45] Nov. 11, 1980

[54] STEP LINK FOR TRANSPORTATION APPARATUS

[75] Inventor: Joseph K. Kraft, Parsippany, N.J.

[73] Assignee: Westinghouse Electric Corp., Pittsburgh, Pa.

[21] Appl. No.: 21,654

[22] Filed: Mar. 19, 1979

[51] Int. Cl.³ .............................................. B65G 17/38

[52] U.S. Cl. ..................................... 198/851; 474/206

[58] Field of Search ................ 198/326, 330, 850–853; 74/245 R, 245 C, 250 R, 250 S, 250 C, 245 LP, 245 S, 251 R, 251 C, 251 S

[56] References Cited

U.S. PATENT DOCUMENTS

| | | | |
|---|---|---|---|
| 1,670,278 | 5/1928 | Belcher | 74/250 S |
| 1,793,783 | 2/1931 | Drake et al. | 198/851 X |
| 2,373,325 | 4/1945 | Mayer | 198/851 X |
| 3,118,317 | 1/1964 | Michalik | 74/250 R X |
| 3,387,697 | 6/1968 | Harrison | 74/250 R X |
| 3,677,388 | 7/1972 | Boltrek et al. | 198/833 |
| 3,682,289 | 8/1972 | Kraft | 198/332 |
| 3,707,220 | 12/1972 | Boltrek et al. | 198/330 |

*Primary Examiner*—Robert B. Reeves
*Assistant Examiner*—Douglas D. Watts
*Attorney, Agent, or Firm*—D. R. Lackey

[57] ABSTRACT

A toothed step link for transportation apparatus, such as escalators, constructed of formed metallic shells. First and second like elements, each including at least one metallic shell, are disposed in spaced relation. A third element, including at least one hollow metallic assembly formed of assembled right- and left-hand metallic shells, which collectively define a plurality of teeth, is disposed in a portion of the space between the first and second elements. The first, second and third elements are held in assembled relation via tubular members which are press fit into aligned openings in the first, second and third elements.

8 Claims, 9 Drawing Figures

STEP LINK FOR TRANSPORTATION APPARATUS

BACKGROUND OF THE INVENTION

1. Field of the Invention

The invention relates in general to transportation apparatus, and more specifically to passenger conveyors such as escalators and movable walks having a plurality of steps, platforms or pallets which are attached to a flexible conveyor formed of step links and step axles.

2. Description of the Prior Art

U.S. Pat. Nos. 3,677,388; 3,682,289 and 3,707,220, all assigned to the same assignee as the present application, disclose new and improved passenger conveyor apparatus, such as escalators, in which the steps are pulled up the incline by a toothed step link. A modular drive unit located in the truss, between the load bearing and return runs, just below the transition between the inclined portion and the upper horizontal portion of the escalator, includes a drive chain which engages toothed step links on both the upper load bearing run and the lower return run.

The escalator construction disclosed by the hereinbefore mentioned patents includes an endless belt having two sides, each of which are formed by pivotally interconnected, toothed step links. The step links are formed of a plurality of superposed, flat steel laminations. Step axles interconnect the two sides of the endless belt, and the steps are clamped to the step axles. The endless belt and steps are guided through the load bearing and return runs, as well as through the turnarounds which interconnect the load bearing and return runs, by axle rollers or guide wheels on the ends of the step axles, trailer wheels on the steps, and separate guide tracks for supporting the guide wheels and the trailer wheels.

The escalator construction of the hereinbefore mentioned patents provides many advantages over escalators which utilize a step chain and a top sprocket-drive machine to pull the steps up the incline. One of the most significant advantages is the substantial reduction in load on the working parts. As the length of the rise increases, the load on the parts remains low, with additional modular drives being added to the incline, as required. The rigid step links maintain a constant distance between the step axles, eliminating the need for tensioning devices, which are required with the step chain construction.

While the load on the conveyor parts of the modular drive escalator is low compared with the conventional drive, any reduction in the weight of the conveyor which can be achieved without sacrificing mechanical strength, would be desirable. A reduction in weight is usually accompanied by a reduction in part cost, and it reduces the dead load on the drive chain of the modular drive unit and on the track system, providing longer chain life and improved ride quality.

SUMMARY OF THE INVENTION

Briefly, the present invention is a new and improved toothed step link for transportation apparatus which substantially reduces the weight and cost of the step link, and the endless, articulated belt constructed therefrom, without deleteriously affecting the mechanical strength of the step link or belt. The new step link also has an improved tooth profile, which improves ride quality.

The new and improved toothed step link is constructed of first, second and third basic elongated elements, with the third element being sandwiched between the first and second elements and held in assembled relation therewith via a pair of press fit and staked tubular members. The third element includes a plurality of teeth, with one of its ends extending outwardly from the assembly to define a male portion of the link. Like ends of the first and second elements extend outwardly from the third element to define a female portion of the step link. The male and female portions of the step link cooperate with female and male portions of like step links, respectively, to form the endless belt, when step axles are assembled with the coupled step links.

The new and improved toothed step link is of modular construction, requiring only three basic part shapes to provide the first, second and third basic elements. Further, the same three basic part shapes may be used to provide first and second different strength step links. The first and second different strength step links are used in the standard 32-inch and 48-inch wide escalators, respectively. The three basic part shapes are each drawn or formed steel shells wherein the part is first blanked from a piece of 0.048 inch thick sheet metal, and then the blank part is drawn to turn the edges of the blank smoothly in the common direction to provide uniform flanges about the main body of the sheet, the ends of which lie in the common plane. Two of the three basic part shapes are right- and left-hand members which are assembled with the ends of their flanges in contact, to provide a hollow assembly having a plurality of cooperatively formed teeth. This hollow assembly is used alone, or with another like assembly, to provide the third element of the step link. The ends of the teeth are circular in profile. The circular profile facilitates the die forming of the blank in the drawing operation, and it also moves the pitch line as close as possible to the addendum circle or tip of the teeth. Moving the pitch line outwardly on the teeth minimizes overlap between the teeth and the drive chain of the modular drive unit, reducing vibration and noise in the area of the modular drive unit, thus improving ride quality.

The remaining basic part shape is an elongated shell member which is symmetrical about its longitudinal axis. This part is used alone or assembled with a like part wherein the ends of their flanges are in contact to form a hollow metallic assembly, to provide each of the first and second elements of the step link.

The new and improved step link is less costly to manufacture than the prior art step link. The new and improved step link also reduces the weight of the step link from 12.5 lbs. to 5.5 lbs. for the 48-inch wide escalator, and 2.75 lbs. for the 32-inch wide escalator. Using an escalator having a 15-ft. rise for purposes of example, step links constructed according to the prior art would weigh 1,550 lbs., the step links constructed according to the teachings of the invention for the 48-inch wide escalator would weigh only 680 lbs., and only 340 lbs. for the 32-inch wide escalator.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 1:
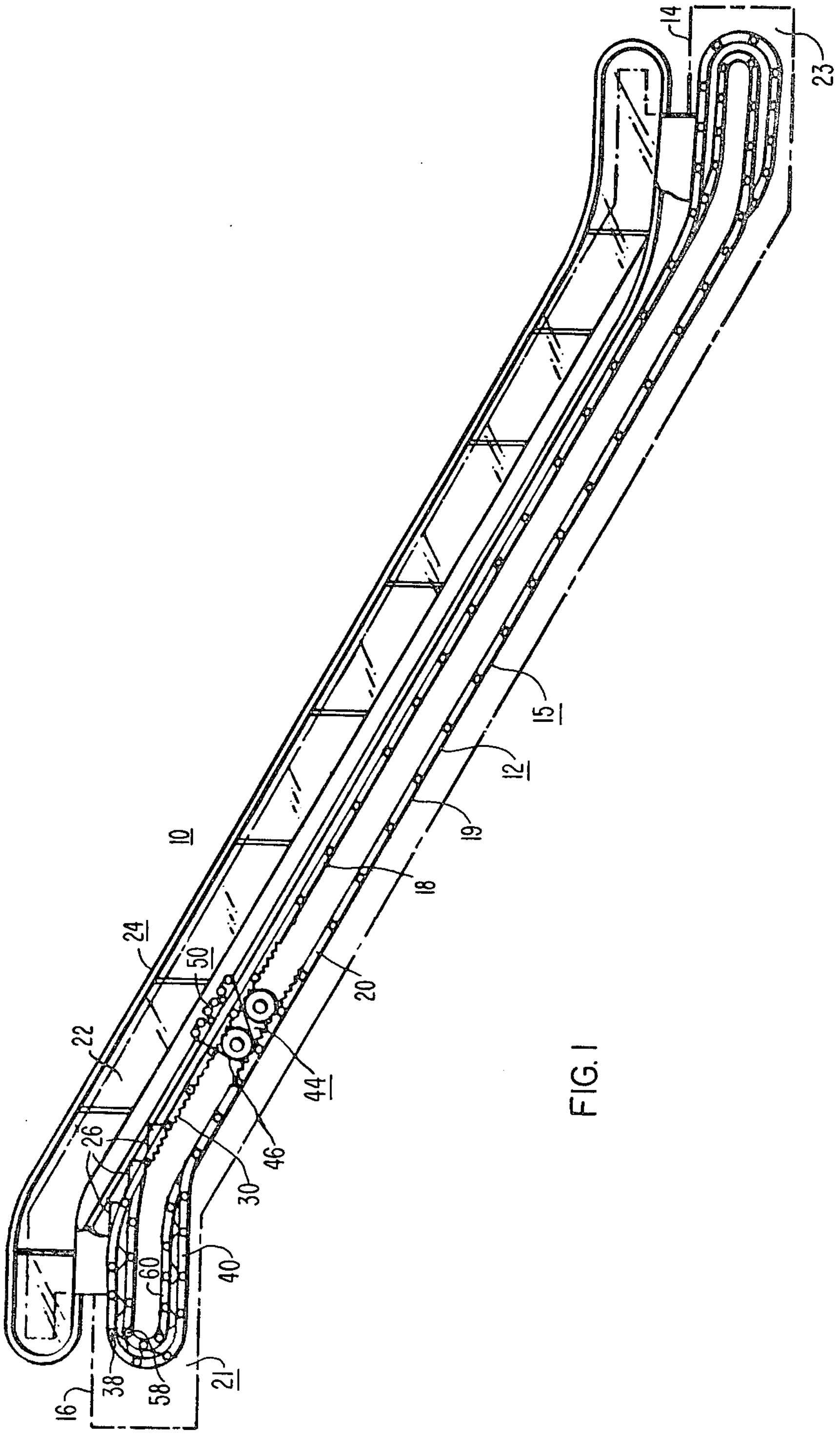
FIG. 1 is an elevational view of a passenger conveyor of the type which may utilize the teachings of the invention.

Referring now to the drawings, and to FIG. 1 in particular, there is shown transportation apparatus 10 which may utilize the teachings of the invention. While the invention is equally applicable to moving walkways having an endless series of rigid segments or platforms, commonly called pallets, it will be described relative to an escalator. Apparatus 10 employs a conveyor portion 12 for transporting passengers between a first landing 14 and a second landing 16. Conveyor 12 is of the endless type, having an articulated belt 15 which is driven about a closed path or loop. While the invention may be utilized with any type of movable stairway which utilizes rigid spacing of the belt supporting guide wheels via toothed step links, its use is particularly advantageous with the modular passenger conveyor construction disclosed in the hereinbefore mentioned U.S. patents, and the invention will be described relative to such construction. The subject matter of the hereinbefore U.S. patents is hereby incorporated into the present application by reference.

Conveyor 12 includes an upper load bearing run 18 upon which passengers stand while being transported between landings 14 and 16, a lower return run 19, and upper and lower turn-arounds 21 and 23, respectively, which interconnect the load bearing and return runs.

Conveyor 12 includes a plurality of steps 26, only a few of which are shown in FIG. 1. Steps 26 move in a closed path, driven by a modular drive unit 44. The endless, flexible belt 15 has first and second sides, each of which are formed of rigid, pivotally interconnected toothed step links 30. The two sides of the belt are interconnected by step axles 36, shown in FIG. 8, to which the steps 26 are connected. The belt 15 is supported by guide and support rollers or wheels 38 which cooperate with guide tracks 40. The steps 26, in addition to being supported by belt 15, are also supported and guided by trailer wheels or rollers 58 which cooperate with trailer guide tracks 60 to guide and support the steps in the endless loop.

Modular drive unit 44 includes a drive motor, sprocket wheels, and chains which engage the toothed step links 30 of the conveyor 12, to pull the endless belt 15 up the incline between the landings 14 and 16.

Figure 8:
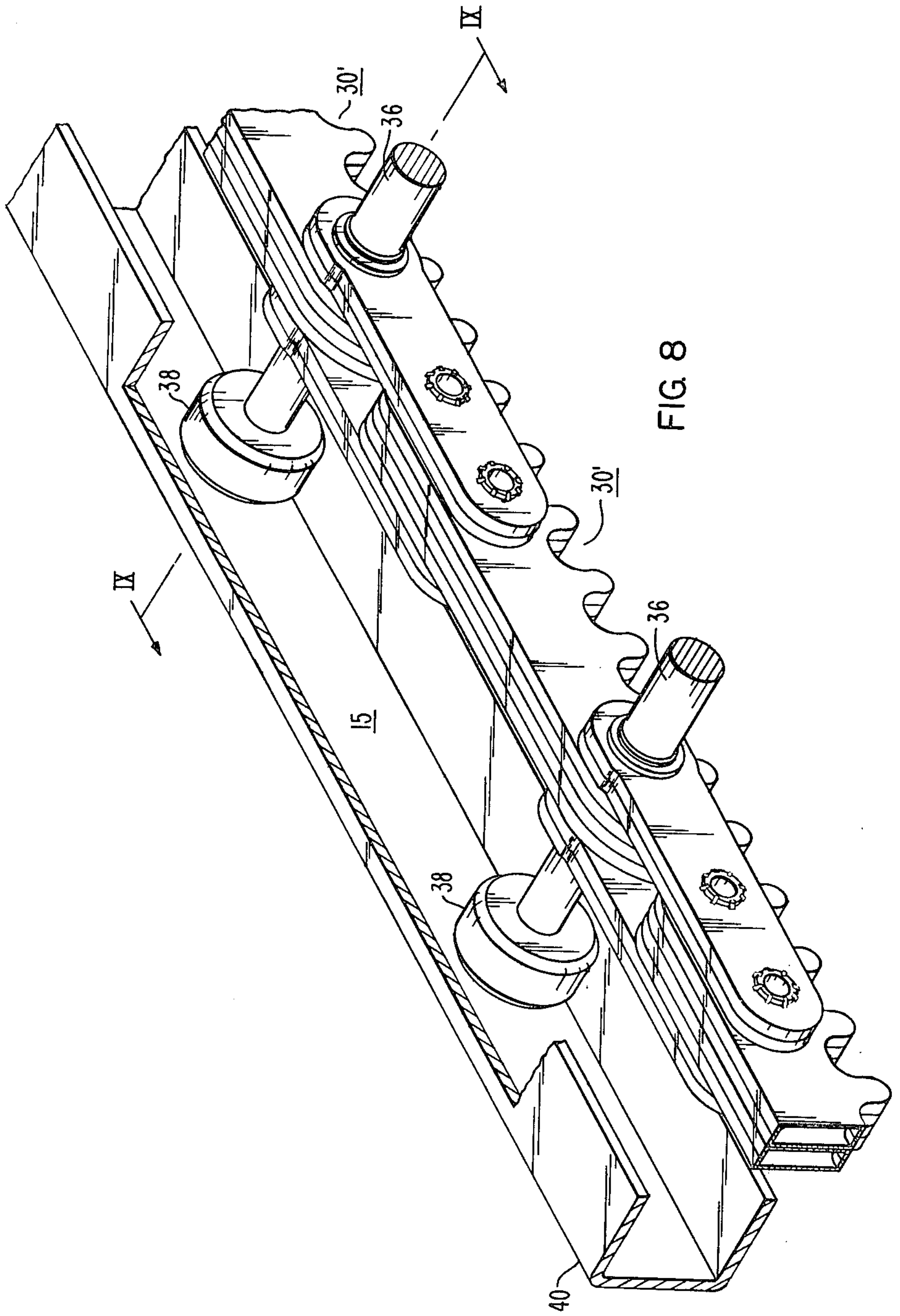
FIG. 8 is a fragmentary, perspective view of an endless belt constructed of the step links shown in FIG. 5.

First and second sides of the endless belt 15 form first and second closed loops, one of which is partially shown in perspective in FIG. 8, with each side being formed of pivotally interconnected toothed step links 30. The two loops are disposed in spaced, side-by-side relation, with the planes of the loops being vertically oriented. A plurality of spaced step axles 36 extends between the loops, transverse to the vertical planes thereof, with the ends of the step axles 30 extending through aligned openings of each pair of adjacent toothed step links 30 of the two loops. In the prior art, the toothed step links 30 are formed of stacked metallic laminations, such that their ends dovetail, enabling openings in their ends to be aligned, while also aligning the toothed step links 30 of each loop.

For example, a typical prior art step link is constructed of 12 flat steel laminations each having a thickness dimension of 0.109 inch, and with the complete laminated step link weighing 12.5 lbs. An endless belt 15 constructed for an escalator having a 15-ft. rise, for example, includes a total of 124 step links, and thus the step links alone weigh 1,550 lbs.

Figure 3:
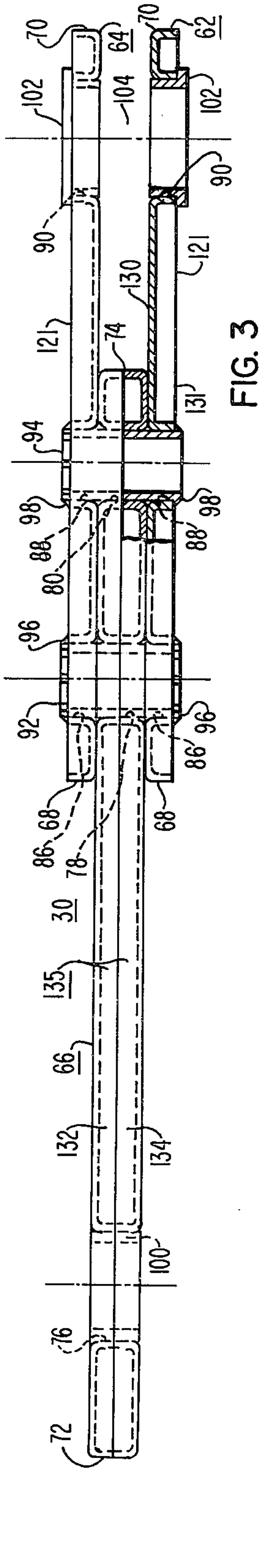
FIG. 3 is a plan view of the step link shown in FIG. 2.
Figure 2:
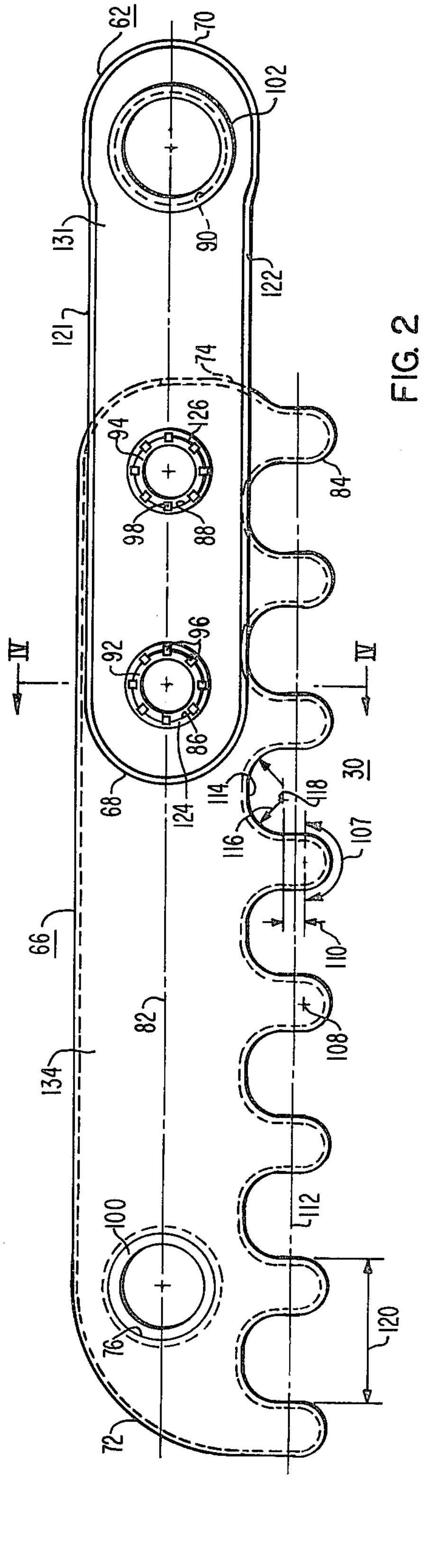
FIG. 2 is an elevational view of a step link constructed according to a first embodiment of the invention.
Figure 4:
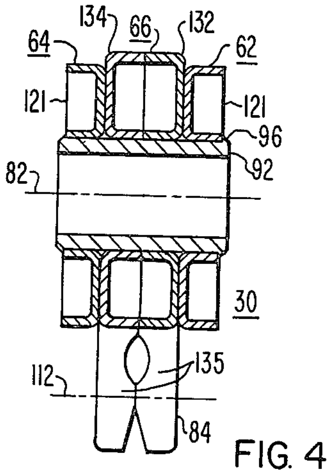
FIG. 4 is a cross-sectional view of the step link shown in FIG. 2, taken between and in the direction of arrows IV—IV.

FIGS. 2, 3 and 4 illustrate a new and improved step link 30 constructed according to a first embodiment of the invention. The new and improved step link 30 features a modular construction which facilitates the manufacture of different step links for the 32-inch and 48-inch wide escalators, using the same parts. Step link 30 shown in FIGS. 2, 3 and 4 is suitable for the 32-inch wide escalator.

More specifically, FIG. 2 is an elevational view of a step link constructed according to a first embodiment of the invention. FIG. 3 is a plan view of the step link 30 shown in FIG. 2, and FIG. 4 is a cross-sectional view of the step link 30 shown in FIG. 2, taken between and in the direction of arrows IV—IV.

Step link 30 includes first, second and third basic elements 62, 64 and 66, respectively, which are preferably constructed of steel. The first and second elements 62 and 64 are of like, elongated construction, having first and second ends 68 and 70, respectively. The first and second elements 62 and 64 are disposed in spaced relation with like ends adjacent to one another. The third element 66, which is an elongated structure having first and second ends 72 and 74, respectively, is sandwiched between the spaced first and second elements 62 and 64 such that its second end 74 extends into the space between the first and second elements 62 and 64, respectively, adjacent to their first ends.

The third element includes an opening 76 adjacent to its first end 72, and first and second openings 78 and 80, respectively, adjacent to its second end, with the centers of these openings all lying on a longitudinal axis 82 of the step link 30. The third element also includes a plurality of teeth 84, such as eight, to be described in greater detail hereinafter. The teeth 84 form a spur rack along one side of the elongated third element 66.

Each of the first and second elements 62 and 64 include first and second openings 86 and 88, respectively, adjacent to its first end 68, and a third opening 90 adjacent to its second end 70. The centers of openings 86, 88 and 90 all lie on the longitudinal axis 82 of the step link 30.

The first, second and third basic elements 62, 64 and 66 are held in assembled relation via first and second tubular members 92 and 94, respectively, which are preferably formed of steel. Openings 86 in the first and second elements 62 and 64 are aligned with opening 78 in the third element, and tubular member 92 is pressed into the aligned openings. For example, if the openings have a diameter of 0.998 inch, plus 0.000, minus 0.002 inch, the tubular member 92 may have an outside diameter of 1.00 inch plus 0.000, minus 0.002 inch, to provide the desired interference or press fit. To ensure that the tubular member 92 will not work loose during usage, its length dimension is selected such that it is slightly longer than the width dimension of the assembled step link, and its ends are staked, as illustrated at 96.

In like manner, openings 88 in the first and second elements are aligned with opening 80 in the third element, and tubular member 94 is pressed into the aligned openings and its ends are staked, as illustrated at 98.

Step link 30 is completed by pressing a hardened sleeve bushing 100 into opening 76 of the third element, and a hardened flanged bushing 102 into the opening 90 in each of the first and second elements 62 and 64. The flanges on the flanged bushings 102 are located on the outside of the space 104 between the second ends 70 of the first and second elements 62 and 64.

The first end 72 of the third element 66 of step link 30 defines a male portion of the step link 30, and the spaced second ends 70 of the first and second elements 62 and 64 define a female portion, with these male and female portions cooperating with female and male portions, respectively, of like adjacent step links. In other words, the first end 72 of another step link 30 would be inserted into space 104 of step link 30, with the opening in bushing 100 aligned with the openings in bushings 102. One end of a step axle 36 is inserted into the aligned openings, with the step axle 36 having a case-hardened sleeve 106 disposed thereon, shown in FIG. 9, upon which the bushings 100 and 102 rotate.

The teeth 84 of the third element 66 are constructed to facilitate the manufacture of the third element according to a preferred embodiment of the invention, which will be hereinafter explained, and also to improve the smoothness of the ride as the endless belt 15 and connected steps 26 proceed across a drive unit 44. As illustrated in FIG. 2, the crest or tip of each tooth 84 is in the form of a semicircle 107 having a center 108. The ends of the semicircle 107 smoothly blend with a portion 110 which forms a surface perpendicular to the longitudinal axis 82 of the step link 30. The pitch line 112 bisects portion 110, just above a line drawn through centers 108. The dedendum then continues to the root 114 via a curved portion having a radius 116, the center of which is indicated at 118. This structure forms a very desirable arrangement as it enables the pitch line to be moved out on the tooth toward its tip. Moving the pitch line 112 further out on the tooth 84 minimizes the engagement overlap between the tooth and the drive chain shown in the hereinbefore mentioned U.S. Pat. No. 3,677,388. Reducing the engagement overlap reduces vibration and noise and smooths the ride as the steps proceed across a drive unit 44.

For example, the specified tooth structure having a pitch 120 of 2 inches, enables the pitch line 112 to be located only 0.12 inch above the centers 108, with the radius of the semicircle 107 being 0.345 inch, the length of portion 110 being 0.24 inch and radius 116 being 0.56 inch.

In order to maintain the specified minimum engagement, a slider bed (not shown) is required in the drive unit 44, located horizontally midway between the drive and idler sprockets, and vertically to support the chain on the pitch line 112 of the teeth 84. The slider bed also has the advantage of allowing the drive chain of the modular drive unit 44 to run with no pre-tension. Thus, the frequency of chain adjustment is reduced, and it promotes better lubrication and longer life.

The step link 30 is of modular construction, requiring only three basic part shapes to construct the first, second and third basic elements 62, 64 and 66, respectively, and the same three basic part shapes may be used to construct a step link for the 48-inch wide escalator, as will be hereinafter explained.

More specifically, the first and second basic elements 62 and 64 are each constructed from one basic part shape. Elements 62 and 64 are of like construction, with the portion of the element above the longitudinal center line 82 being a mirror image of the portion below the center line. Thus, like parts are oppositely oriented to form the first and second basic elements 62 and 64.

In this embodiment, a single formed part or shell member 121 functions as each basic element 62 and 64. A steel sheet having a thickness of 0.048 inch, for example, is first blanked to the desired outline, and the blank is then drawn to curve the outer edges of the part and form a flange 122 which extends outwardly from a common side 131 of the major flat portion of the blank, and to form flanges 124 and 126 about openings 86 and 88, respectively, and a like flange about opening 90. The ends of these flanges all lie in a common plane 128. The opposite side 130 from the flanged side 131 is smooth, with no protrusions, and it is the side which faces space 104 and which contacts the third basic element 66.

The remaining two basic part shapes are used to construct the third major element 66, and they are right- and left-hand formed or drawn parts or shell members 132 and 134, respectively, with their construction being similar to shell member 121 hereinbefore described relative to the first and second basic elements. The right- and left-hand shell members 132 and 134 are assembled with the ends of their flanges in contact, to provide a hollow but exceptionally strong metallic assembly 135. As best shown in FIG. 4, the right- and left-hand parts 132 and 134 cooperatively provide the walls of opening 78, and teeth 84, as well as the walls of the remaining openings, and the side walls at the outer edge of the assembly. A step link assembly constructed according to the first embodiment of the invention which will functionally replace the laminated prior art step link structure hereinbefore referred to, and this new step link weighs only 2.75 lbs. Thus, the 124 step links required for a 15-ft. rise escalator only weighs 340 lbs., compared with 1,550 lbs. for a like number of prior art step links.

Figure 7:
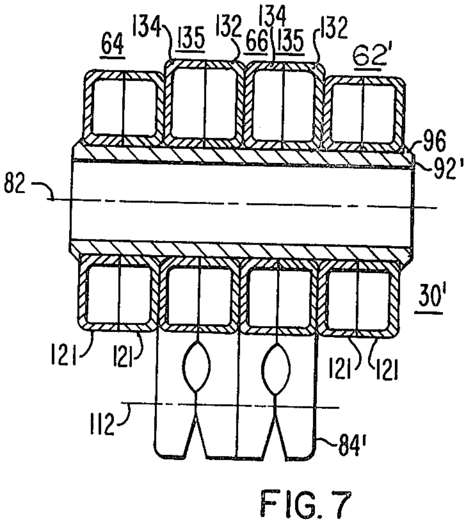
FIG. 7 is a cross-sectional view of the step link shown in FIG. 5, taken between and in the direction of arrows VII—VII.
Figure 6:
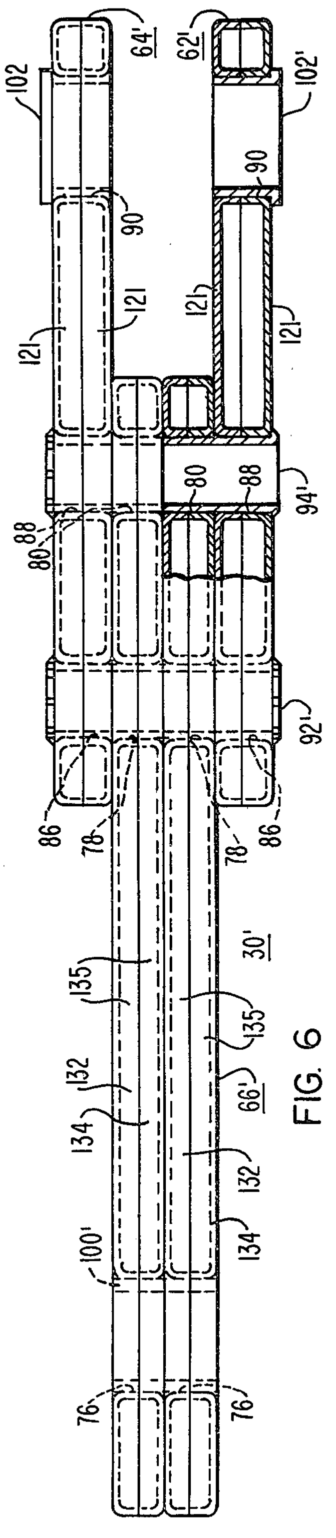
FIG. 6 is a plan view of the step link shown in FIG. 5.
Figure 5:
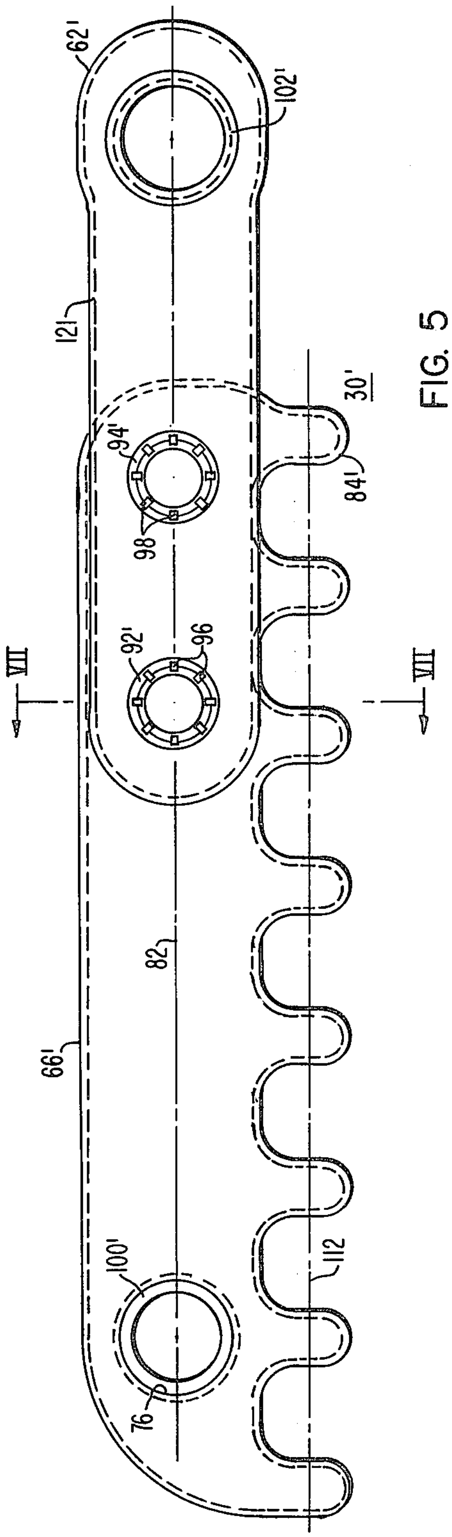
FIG. 5 is an elevational view of a step link constructed according to a second embodiment of the invention.

FIGS. 5, 6 and 7 illustrate a step link 30′ suitable for the 48-inch wide escalator, constructed from the same three basic parts or shell members of which step link 30 is constructed. FIG. 5 is an elevational view of a step link 30′ constructed according to the second embodiment, FIG. 6 is a plan view of step link 30′, and FIG. 7 is a cross-sectional view of step link 30′ shown in FIG. 5, taken between and in the direction of arrows VII—VII. Elements in step link 30′ which are the same as those in step link 30 are given like reference numerals. Like reference numerals except for a prime mark in the second embodiment indicate the part for this function has been modified.

More specifically, the first and second major elements 62' and 64' are each constructed of two of the shell members 121, instead of one, as in the FIG. 2 embodiment. The two shell members 121 are disposed with the ends of their flanges in contact to define a hollow, metallic member in which flanges 124 cooperatively define an opening having a length twice as long as openings 86. Flanges 126 cooperatively define an opening having a length twice as long as opening 88. Flanges about opening 90 cooperatively define an opening twice as long as opening 90, and flanges 121 cooperatively define a side wall about the composite hollow structure. Flanged sleeve bearings 102' are pressed into openings 90'. Flanged sleeve bearings 90' are similar to flanged sleeve bearings 90, except for their longer length.

The third basic element 66' is constructed of two similar hollow assemblies 135, instead of one, as in the FIG. 2 embodiment. The two hollow metallic assemblies 135 are disposed in side-by-side relation, with their openings 76 aligned, openings 78 aligned, and openings 80 aligned. Sleeve bearing 100' is pressed into the aligned openings 76. Sleeve bearing 100' is similar to sleeve bearing 100, except for its longer length.

The three basic elements 62', 64' and 66' are assembled via tubular members 92' and 94', which pressed into aligned openings 86 and 78, and 88 and 80, respectively, and staked. Tubular members 92' and 94' are similar to tubular members 92 and 94, respectively, except for their longer lengths. The step links 30' weigh 5.5 lbs. each, and thus the step links 30' required for an escalator having a 15-ft. rise weigh only 680 lbs., compared with 1,550 lbs. for a like number of prior art step links.

Figure 9:
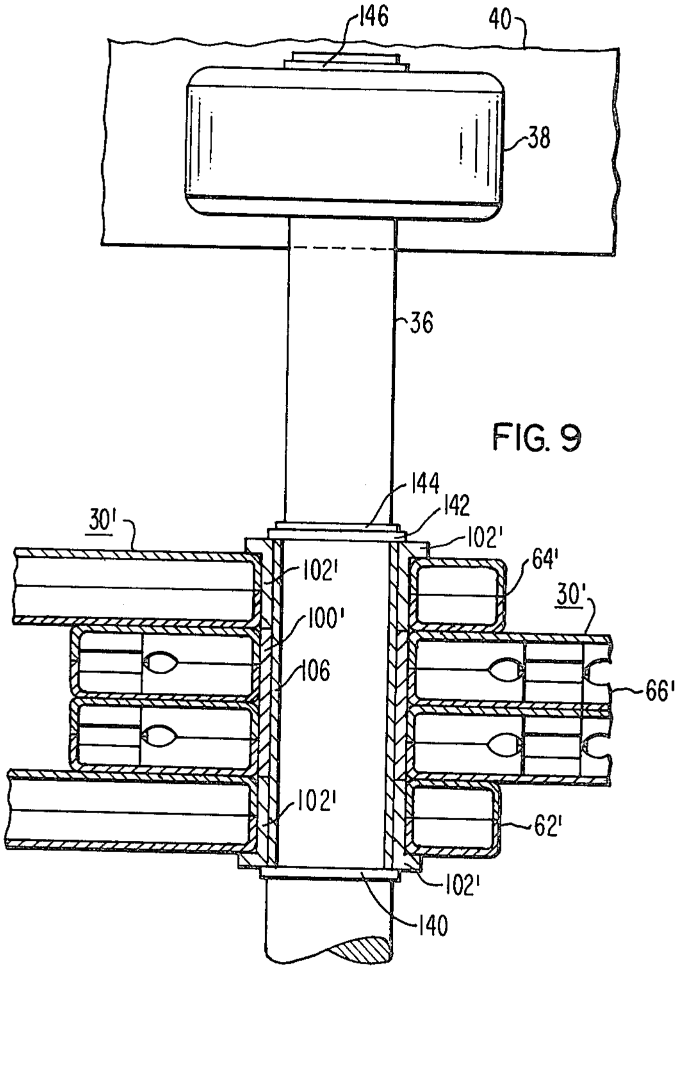
FIG. 9 is a partial cross-sectional view of the endless belt shown in FIG. 8, taken between and in the direction of arrows IX—IX.

FIG. 8 is a fragmentary, perspective view of one side of endless belt 15, illustrating toothed step links 30' interconnected via step axles 36. FIG. 9 is a cross-sectional view of the step axle bearing assembly shown in FIG. 8, taken between and in the direction of arrows IX—IX. A hardened steel sleeve 106 on the step axle 36 is disposed against a retaining ring 140, the end of the step axle 36 is inserted through the aligned openings in two adjacent step links 30', through sleeve bearings 102' and 100', and the step link assembly is held in assembled relationship about sleeve 106 via a washer 142 and a retaining ring 144. The support and guide wheel 38 may then be disposed on the end of the step axle 35, and secured thereto with a retaining ring 146.

In summary, there has been disclosed a new step link constructed of formed steel sheets or laminations having a thickness of 0.048 inch, which significantly reduces the manufacturing cost and weight of the endless belt 15 while providing the requisite strength. Weight saving is a prime feature, not only because it reduces the manufacturing cost of the parts, but because it reduces the dead load on the drive chain and the track system, which extends chain life and provides a smoother ride quality. A step link for the 32-inch wide escalator uses the same drawn stampings or shell members as the 48-inch wide escalator, but only one-half the quantity. The formed laminations or shell members are retained and aligned by press-fit bushings and tubular members. The tubular members are staked on each end to assure retention. The tubular members connect the female to the male end of the step link, and they carry the tensile load from the female to the male end.

The formed shell members provide the required strength by strategically locating the material. The step link has a massive, rugged appearance, yet it is light in weight. The formed part also provides rounded corners for safe handling. The shape of the teeth on the new step link is also improved to provide easy entrance and exit of the drive chain. The pitch line is located close to the tip of the teeth, only 0.12 inch above the tangent of the curved tooth end. The circular profile of the teeth gives a minimum shape that can be formed and allow the drive chain to engage the tooth as close as possible to the tip of the teeth. This minimizes the engagement overlap between the teeth and the drive chain, providing a smoother ride quality in the area of the modular drive unit.

I claim as my invention:

1. A toothed step link for interconnection with like step links via step axles to form an endless articulated belt for transportation apparatus, comprising:

first and second elongated elements of like construction having first and second ends, said first and second elongated elements being disposed in spaced relation with like ends adjacent to one another;

a third elongated element having first and second ends, said third elongated element having a plurality of teeth, said third elongated element having its second end disposed in the space between the first ends of said first and second elements;

said third element including at least one hollow metallic assembly formed of assembled right- and left-hand shell members, each of said right- and left-hand shell members having flat major wall portions formed of a metallic sheet having predetermined openings therethrough and a plurality of teeth along an outer edge, and including integral flange portions which extend outwardly from a common side of said flat major wall portion;

said flange portions including portions which encircle the outer periphery of said flat major portion, including said plurality of teeth, and portions which encircle the predetermined openings, with the ends of at least certain of said flanged portions lying in a common plane;

said right- and left-hand shell members being assembled with the ends of their flange portions which lie in a common plane being in contact with one another, with their flange portions which encircle their outer periphery cooperatively defining a side wall and a plurality of teeth, and with their flange portions which encircle the predetermined openings cooperatively defining the walls of openings which extend through the resulting hollow composite structure;

and means joining said first, second and third elements to provide an assembly wherein the first end of the third elongated element, and the second ends of the first and second elongated elements define male and female portions, respectively, for cooperating with female and male portions, respectively, of like assemblies.

2. The toothed step link of claim 1 wherein the first and second elements each include at least one shell member, with the at least one shell member of the first element being configured and dimensioned the same as the at least one shell member of the second element;

said at least one shell member of the first and second elements having a predetermined flat major wall portion formed of a metallic sheet having predetermined openings therethrough, and including integral flange portions which extend outwardly from a common side of said flat major wall portion;

said flange portions including a portion which encircles the outer periphery of said flat major portion, and portions which encircle the predetermined openings, with the ends of at least certain of said flanged portions lying in a common plane;

with the sides of the first, second and third elements which are opposite to their flanged sides being in contact with one another in the assembly of the first, second and third elements.

3. The step link of claim 1 wherein the cooperatively formed teeth of the third elongated element have curved ends which have a profile, when viewed from one of the sides of the flat major wall portions, in the shape of a semicircle, and a pitch line about 0.12 inch above the center of the semicircle.

4. The step link of claim 2 wherein the openings in the first and second elements include first and second openings adjacent to their first ends, and a third opening adjacent their second ends, the opening in the third element include a first opening adjacent to its first end and second and third openings adjacent to its second end, and wherein the means joining said first, second and third elements include a first tubular member disposed in the first openings of the first and second elements and the second opening of the third element with a press fit, and a second tubular member disposed in the second openings of the first and second elements and the third opening of the third element with a press fit.

5. The step link of claim 4 including a sleeve bushing disposed in the first opening of the third element with a press fit, and first and second sleeve bushings having a flange on one end disposed in the third openings of the first and second elements, respectively, with their flanges disposed on the opposite sides of the space between the first and second members.

6. The step link of claim 1 wherein the third element includes at least two hollow metallic assemblies disposed, in contacting, side-by-side relation between the first and second elements, with each of the at least two hollow metallic assemblies being formed of right- and left-hand shell members.

7. The step link of claim 2 wherein each of the first and second elements include two shell members of like construction, oppositely oriented and assembled with the ends of their flange portions which lie in a common plane in contact with one another to provide a hollow metallic assembly in which the contacting flange portions cooperatively define a side wall about the outer periphery, and the walls of openings which extend through the hollow assembly.

8. The step link of claim 7 wherein the third element includes at least two hollow metallic assemblies each formed of right- and left-hand shell members, with the at least two hollow metallic members being contacting side-by-side relation in the space between the first and second elements.

* * * * *